(12) United States Patent
Nabuurs

(10) Patent No.: US 6,454,346 B1
(45) Date of Patent: Sep. 24, 2002

(54) OPEN ROOF CONSTRUCTION FOR A VEHICLE, AND A VEHICLE HAVING SUCH OPEN ROOF CONSTRUCTION

(75) Inventor: Martinus Wilhelmus Maria Nabuurs, Overloon (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/744,266

(22) PCT Filed: Jul. 12, 1999

(86) PCT No.: PCT/NL99/00445

§ 371 (c)(1),
(2), (4) Date: Jan. 22, 2001

(87) PCT Pub. No.: WO00/06404

PCT Pub. Date: Feb. 10, 2000

(30) Foreign Application Priority Data

Jul. 27, 1998 (NL) .............................................. 1009743

(51) Int. Cl.[7] .............................................. B60J 7/047
(52) U.S. Cl. ........................... 296/216.06; 296/216.03; 296/216.08
(58) Field of Search ..................... 296/216.06–216.09, 296/220.01, 221–223, 216.03; 16/87.4 R, 95 R; 384/15

(56) References Cited

U.S. PATENT DOCUMENTS

| | | | |
|---|---|---|---|
| 2,182,019 A | 12/1939 | Eisele | 308/3 |
| 2,190,462 A | 2/1940 | Votypka | 296/137 |
| 3,290,087 A | 12/1966 | Werner | 296/223 |
| 3,446,539 A | 5/1969 | Sartorio | 308/3.5 |
| 4,376,543 A * | 3/1983 | Sakagami | 277/237 R |
| 4,711,484 A | 12/1987 | Tuerk | 296/105 |
| 4,752,099 A | 6/1988 | Roos et al. | 296/223 |
| 4,892,416 A | 1/1990 | Hassler, Jr. et al. | 384/58 |
| 4,969,681 A | 11/1990 | Schleicher et al. | 296/223 |
| 5,197,779 A * | 3/1993 | Mizuno et al. | 296/223 X |
| 5,540,478 A * | 7/1996 | Schuch | 296/210 |
| 5,676,417 A | 10/1997 | Olivier | 296/155 |
| 6,129,413 A * | 10/2000 | Klein | 296/220.01 |
| 6,145,911 A | 11/2000 | Sturt et al. | 296/65.01 |
| 6,305,740 B1 * | 10/2001 | Staser et al. | 296/222 |

FOREIGN PATENT DOCUMENTS

| | | | |
|---|---|---|---|
| DE | 1575424 | 1/1970 | 384/15 |
| DE | 42 27 400 A | 2/1994 | |
| DE | 195 25 839 C | 8/1996 | |
| EP | 0 442 773 A1 | 8/1991 | |
| EP | 0 786 370 A1 | 7/1997 | |
| GB | 0671872 | 5/1952 | 384/15 |
| GB | 2 122 955 A | 1/1984 | |
| WO | WO92004199 * | 3/1992 | 296/223 |

OTHER PUBLICATIONS

U.S. patent application Ser. No. 09/766,036, Nabuurs, filed Jan. 19, 2001.

* cited by examiner

*Primary Examiner*—Dennis H. Pedder
(74) *Attorney, Agent, or Firm*—Westman, Champlin & Kelly, P.A.; S. Koehler

(57) ABSTRACT

The invention relates to improvements in open roof constructions, which are particularly, but not exclusively of the rail-to-rail type. The side beams of these open roof constructions are generally attached directly to the reinforcement beams on the longitudinal edges of the roof of the vehicle. According to the invention the side beams are manufactured from special extrusion sections which are very easily adaptable to various designs of the open roof construction, which are mountable into the vehicle in a rational manner, and which enable the provision of additional functions.

25 Claims, 12 Drawing Sheets

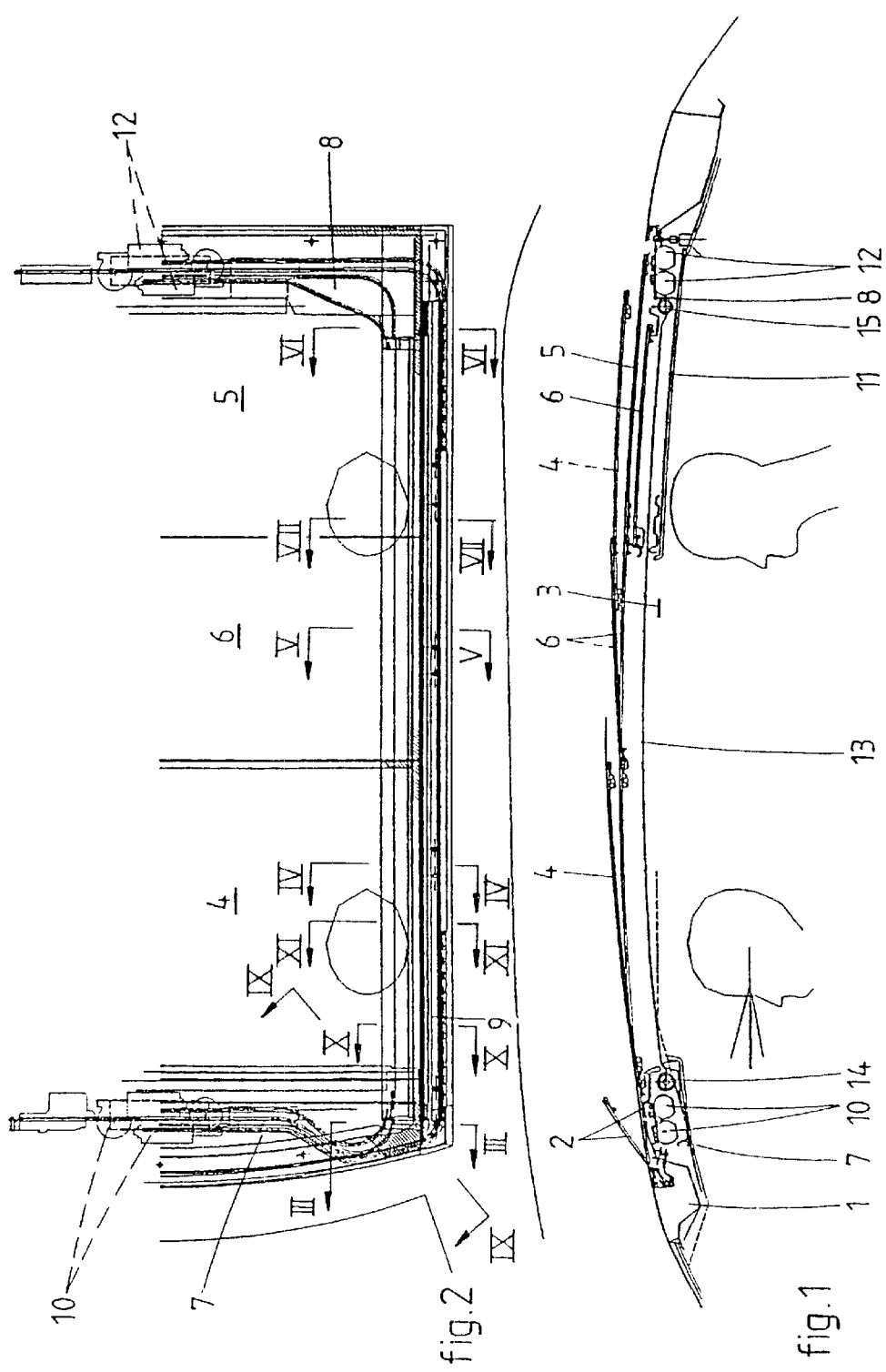

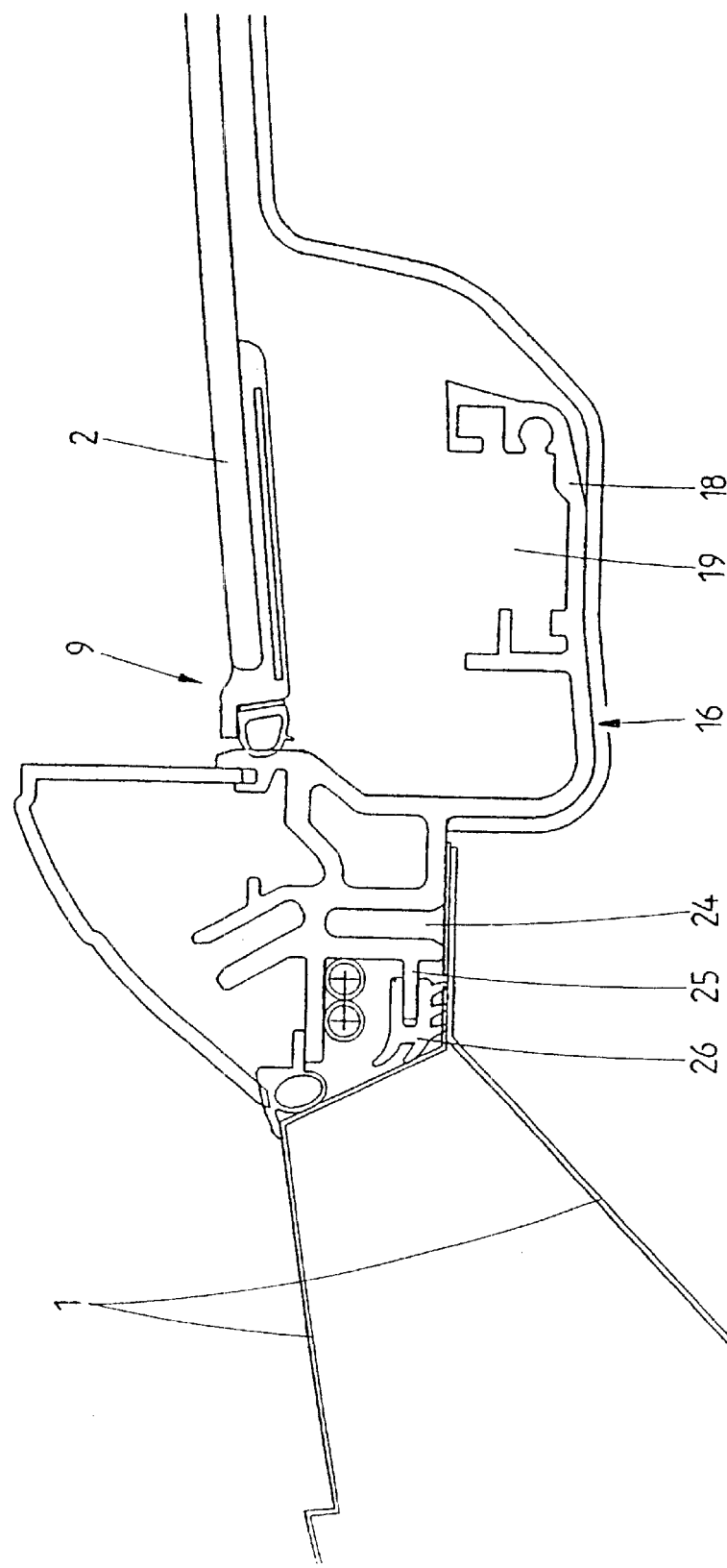

OPEN ROOF CONSTRUCTION FOR A VEHICLE, AND A VEHICLE HAVING SUCH OPEN ROOF CONSTRUCTION

The invention relates to an open roof construction for a vehicle, in particular, but not exclusively, a combination roof with several closure means or panels. The open roof construction is intended to be completely integrated in the vehicle, wherein the open roof construction will form the entire roof plate of the vehicle.

SUMMARY OF THE INVENTION

Open roof constructions of this kind are known in several embodiments thereof, and the object of the invention is to provide further improvements, in particular with regard to the side beams of the stationary part of the open roof construction. Generally, said side beams are directly secured to the strengthening beams on the longitudinal edges of the vehicle roof. According to the invention, as indicated in the appended claims, the side beams are made of special extruded sections, which can be very easily adapted to different designs of the open roof construction, which can be mounted in the vehicle in a rational manner and which enable the provision of additional functions.

The invention will be explained in more detail hereafter with reference to the drawings, which schematically illustrate embodiments of the invention.

BRIEF DESCRIPTION OF THE DRAWINGS

FIG. 1 is a very schematic longitudinal sectional view of one embodiment of the open roof construction according to the invention, from which all operating mechanism have been omitted for easy reference.

FIG. 2 is a plan view of the open roof construction of FIG. 1, which is shown detached from the vehicle roof and without operating mechanisms.

FIGS. 3–6 are larger-scale sectional views along lines III—III, IV—IV, V—V and VI—VI in FIG. 2.

FIG. 7 and FIG. 8 are sectional views along line VII—VII in FIG. 2, wherein FIG. 7 shows all panels in the completely open position, while FIG. 8 shows the panels in the closed position.

DETAILED DESCRIPTION OF THE ILLUSTRATIVE EMBODIMENTS

Figure 4:
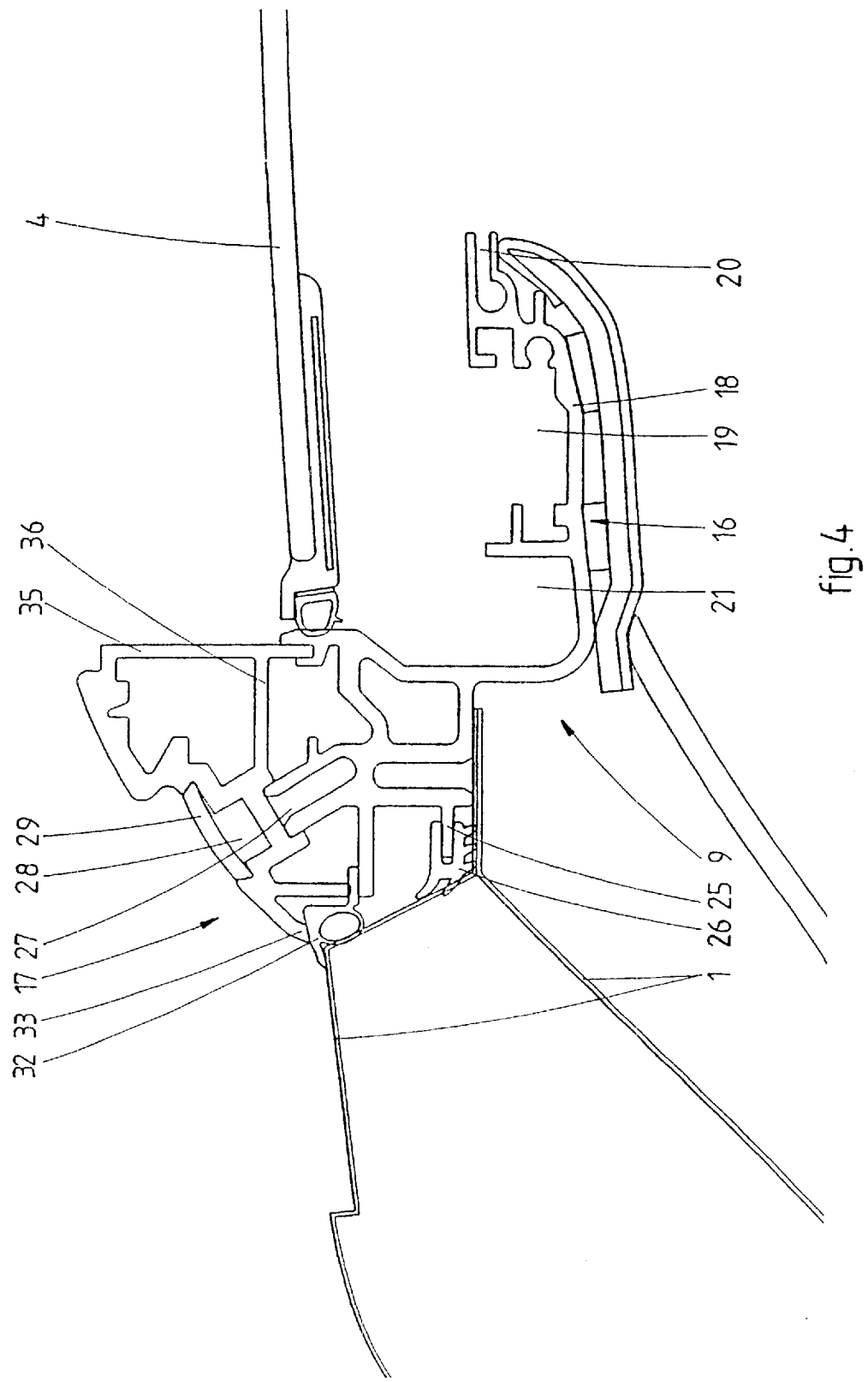

FIGS. 1 and 2 show the general arrangement of the embodiment of the open roof construction according to the invention, wherein FIG. 1 shows the open roof construction mounted in the roof of a vehicle (not completely shown), and wherein the open roof construction according to the invention in fact forms the entire roof of the vehicle and the frame of the open roof construction is directly attached to strengthening beams 1 of the vehicle which are present on the front,. rear and longitudinal edges of the vehicle roof. Such open roof constructions are known as rail-to-rail systems.

FIGS. 1 and 2 furthermore show that the open roof construction comprises a number of closure means, in this case in the form of rigid panels, which may or may not be transparent, and which are fixedly or movably mounted. In the illustrated embodiment, the open roof construction comprises a front panel functioning as a wind deflector 2, which is in principle mounted before a passage opening 3 of the open roof construction. Wind deflector 2 can be pivoted from a closed position to an rearwardly sloping position, whether or not via its own drive unit.

The open roof construction furthermore comprises a panel 4, which, because of the manner in which it is moved and guided by an operating mechanism (not shown), is known in the industry as a topslider, whereby the panel 4 is guided in guide rails in a manner yet to be described and illustrated, and whereby the panel 4 can be moved upwards from the closed position and subsequently rearwards to a position above the fixed roof of the vehicle, which in this embodiment is made up of a panel 5 of the open roof construction, which is fixedly mounted to the vehicle.

In the closed position, a panel 6 is present between panels 4 and 5. The panel 6 is capable of making the movements of a sliding-tilting roof, that is, panel 6 can on the one hand be moved from the closed position to the rearwardly sloping ventilating position, and on the other hand it can be moved downwards and subsequently rearwards under the fixed roof of the vehicle consisting of panel 5. Preferably, the various movable panels 2, 4, 6 each have their own drive unit, so that the occupants of the vehicle are capable of adjusting the position of the various panels entirely as they wish. Several positions may furthermore be pre-programmed in the control unit, of course. When both panels 4 and 6 are completely open, a very large opening is created.

In FIG. 2 the various parts of the frame of the open roof construction can be distinguished, namely, a front beam 7 extending in a transverse direction, a rear beam 8 extending parallel thereto on the rear side, and side beams 9 interconnecting said beams, 7 and 8 which side beams a extend in the longitudinal direction of the vehicle on either side of passage opening 3 and panel 5, only one of which beams is shown, but the parts shown in FIG. 2 are present in mirror symmetry therewith on the other side of the axial line. Mounted on the front and rear beams 7, 8 are various electric motors 10, 12 for operating the various panels 2, 4 and 6 and also for operating a rollable sun screen 13 (a so-called rollo) which is wound on a roller 14 at the front side and on a roller 15 at the rear side, whereby one of said rollers 14, 15 is driven and the other roller 15, 14 is spring-loaded. The sun screen 13 of a sun-resistant and/or heat-resistant cloth or the like is guided in said side beams 9 with its side edges, and it furthermore includes narrow strips which move through side beams 9 and which are positioned before passage opening 3 so as to release said passage opening 3. Sun screen 13 may be provided with transversely extending members for keeping sun screen 13 nicely taut. Sun screen 13 may comprise various parts having specific properties along its length, so that the occupants of the vehicle can activate a particular part of the sun screen according to their requirements.

The rear, fixed panel 5 may be made of a transparent or a non-transparent material and, together with roof trim 11, it forms a space for accommodating panel 6 in the open position thereof.

FIGS. 3–8 are more detailed views of the construction of one of the side beams 9. The various FIGS. show various sectional views along the length of the side beam 9.

As is shown in FIGS. 4–8, each side beam 9 is built up of a lower extruded section 16 and an upper extruded section 17. Lower extruded section 16 comprises a horizontal guide rail 18 with a guide groove 19 opening in an upward direction, which functions to guide the operating mechanism for panel 6 of the sliding-tilting roof. Said operating mechanism may be of a conventional construction, it does not form part of the present invention, and therfore, is not shown. Said guide rail 18 bounds the passage opening 3 in a lateral direction and furthermore comprises a groove 20 for guiding the side edges of sun screen 13. The outward part of guide rail 18 of lower extruded section 16 is in the form of a so-called wet part 21, which functions to catch and drain any water that has seeped through. Wet part 21 of side beam 9 connects at least to a wet part 22 (FIG. 9) of front beam 7, to which at least two water draining hoses 23 connect for draining the water that has seeped through outside the vehicle body.

Figure 7:
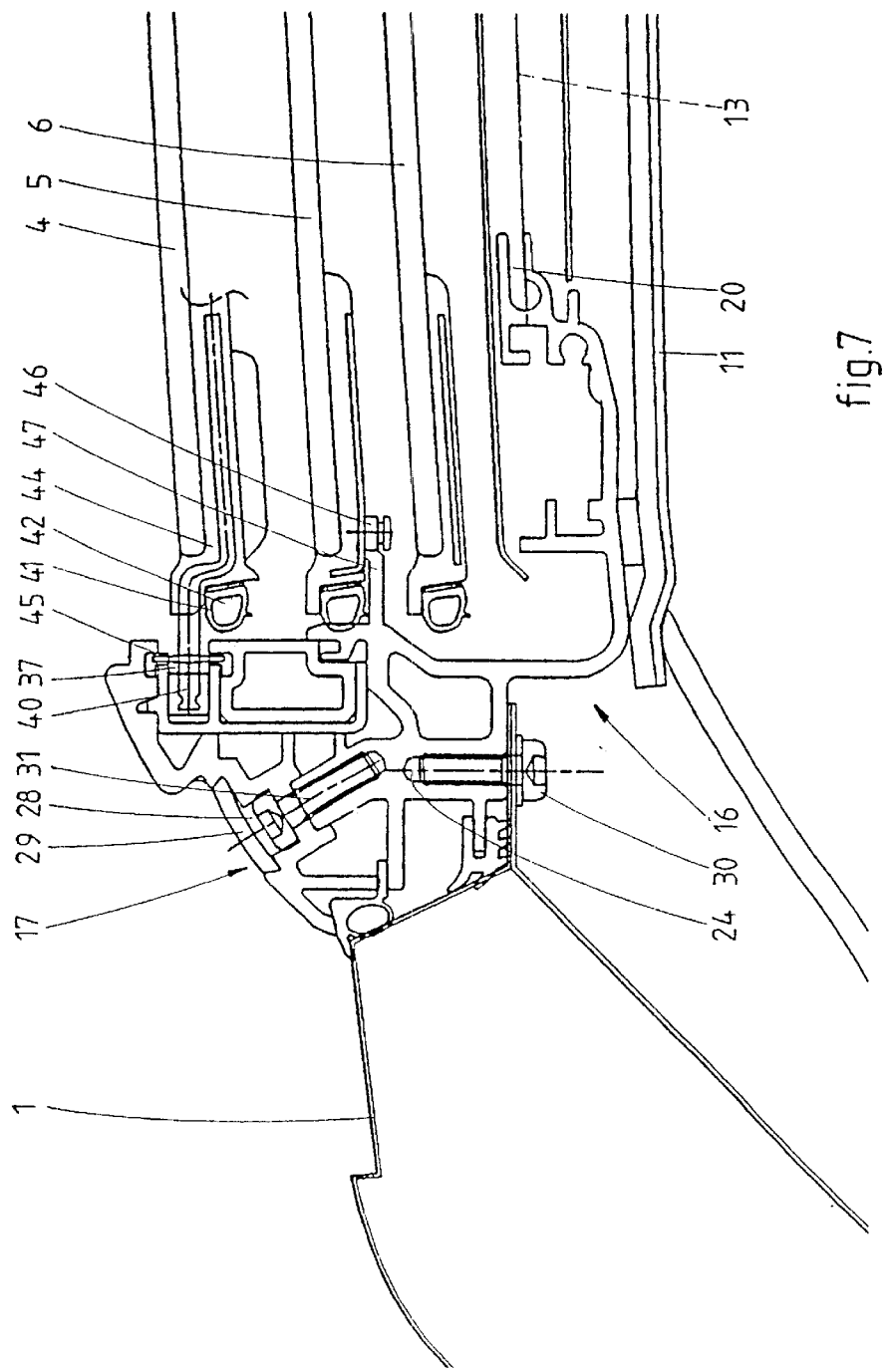

Referring to FIGS. 3 and 7, lower extruded section 16 includes a fastening screw 24, in which fastening means, such as fastening screws or bolts 30 can engage for fixing the side beams 9 to the strengthening beams 1 of the fixed roof. An outwardly extending horizontal flange 25 is furthermore present near fastening screw 24 for mounting a lower seal 26.

The upper and the lower sealing section fit together, and the upper extruded section 17 can be snapped or possibly slid onto the lower extruded section 16 to form one closed unit therewith, and subsequently the upper extruded section 17 can be fixed by means of screws 31, whereby screws 31 engage in a fastening screw 27, whereby the head of fastening screws 31 can be received in a groove 28 in upper extruded section 17, which groove can be covered by a dovetailed cover 29.

FIGS. 4–8 furthermore show an outer edge sealing section 32 clamped between said upper and said lower extruded section 16, 17, which sealing section 32 provides the upper seal between the open roof construction and the upper side of the strengthening beams 1 of the vehicle roof. A downwardly sloping outer flange 33 of upper extruded section 17 presses onto sealing section 32 from above and retains it in engagement with strengthening beams 1.

Figure 5:
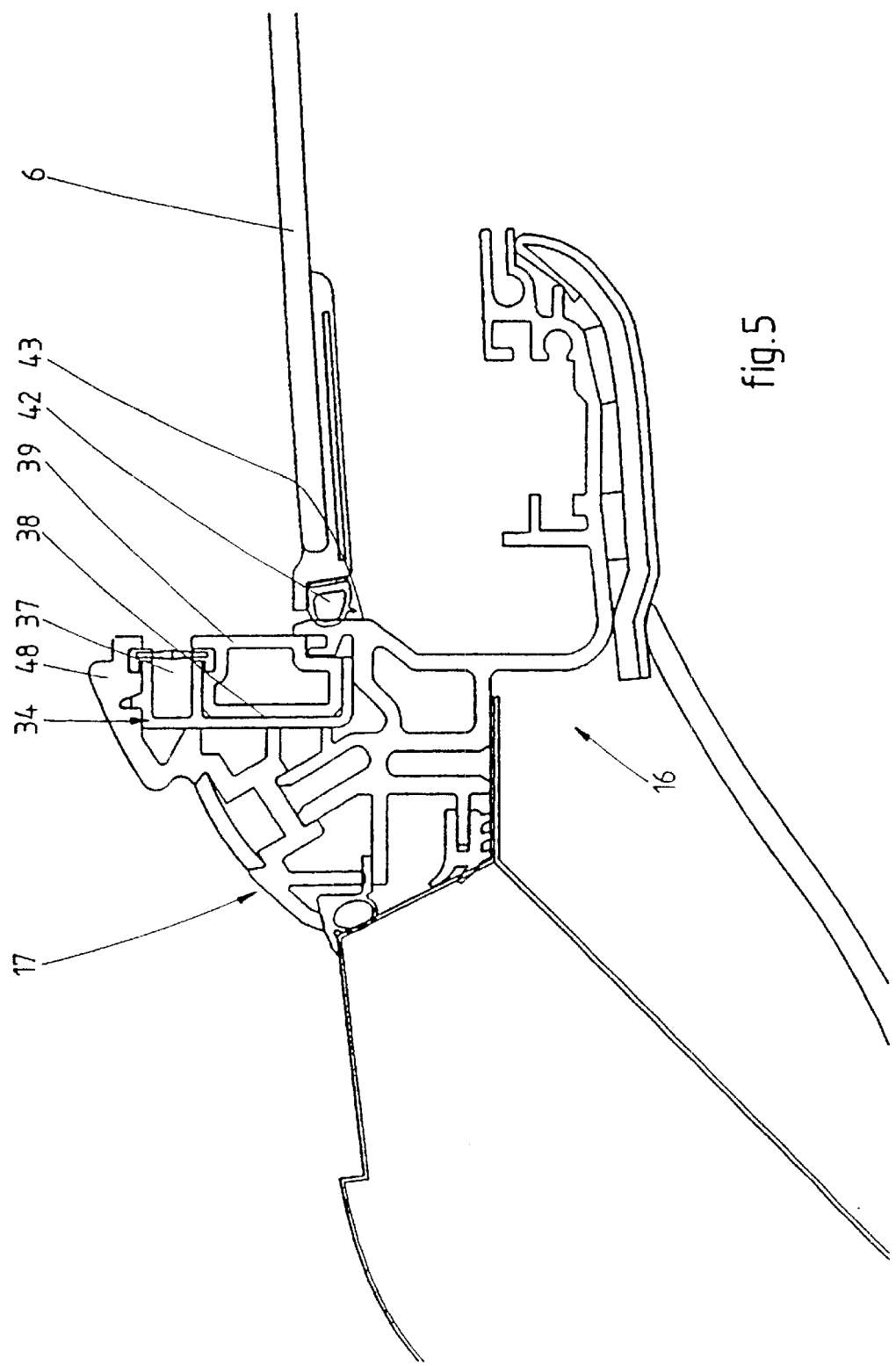

The drawings furthermore show a further section being clampingly accommodated between extruded sections 16 and 17, namely, a guide section 34 for guiding guide members (yet to be discussed) of panel 4 of the topslider. A comparison of FIGS. 4 and 5 shows that parts of the upper extruded section 17 must be removed, in particular by means of a milling operation, in order to accommodate the guide section 34 between extruded sections 16 and 17. The vertical wall 35 and the horizontal wall 36 of upper extruded section 17 which are shown in FIG. 4 have been largely removed in FIGS. 5–8 in order to make it possible to accommodate guide section 34. Guide section 34 is provided with an upper, horizontal guide groove 37 opening in inward direction and a lower space 38, which is closed over the larger part of the length of extruded section 17 by a filling member 39, but which is filled in suitable places with a (plastic) guide block (not shown) for downward guidance of the guide members of panel 4 of the topslider.

FIG. 7 shows one of the guide members of panel 4 of the topslider, which guide member is in the form of a sliding shoe 40. The shoe 40 which is slidably accommodated in guide groove 37 of guide section 34, and which is also capable of movement in the associated guide block (not shown). Sliding shoe 40 is attached to a connecting part 41, which forms a connection between sliding shoe 40 and panel 4. FIG. 7 clearly shows that connecting part 41 is attached to the underside of the panel 4, but extends upwards at the side edge of panel 4 so as to extend above and along a circumferential seal 42 of panel 4. The main advantage of this arrangement is that the panel 4, in the closed position thereof (see for example FIG. 3), forms a seal against an at least substantially vertical sealing surface 43 of lower extruded section 16, which is positioned under guide groove 37 for sliding shoe 40, so that the presence of said guide groove will not cause any sealing problems at the edge of panel 4, which would indeed be the case if sliding shoes 40 would be positioned at a level lower than that of circumferential seal 42. The connecting part 41 is attached to panel 4 by means of an encapsulation 44, and said encapsulation 44 also provides the seal between connecting part 41 and panel 4 on the one hand and circumferential seal 42 on the other hand. Circumferential seal 42 is likewise attached to panel 4 by means of encapsulation 44.

FIGS. 5–8 furthermore show that the horizontal guide groove 37 is sealed by means of vertically extending sealing means 45, which are clamped on the upper and lower side between guide section 34 and upper extruded section 17 or filling member 39. In the illustrated embodiment, the sealing means 45 consist of sealing lips extending from the upper and lower side, which abut against each other in non-deformed condition and which can deform so as to allow the passage of connecting part 41 of panel 4. Said sealing means 45 function to keep guide groove 37 free as much as possible from moisture and dirt that might have an adverse effect on the smooth movement of sliding shoe 40 in guide groove 37.

Figure 6:
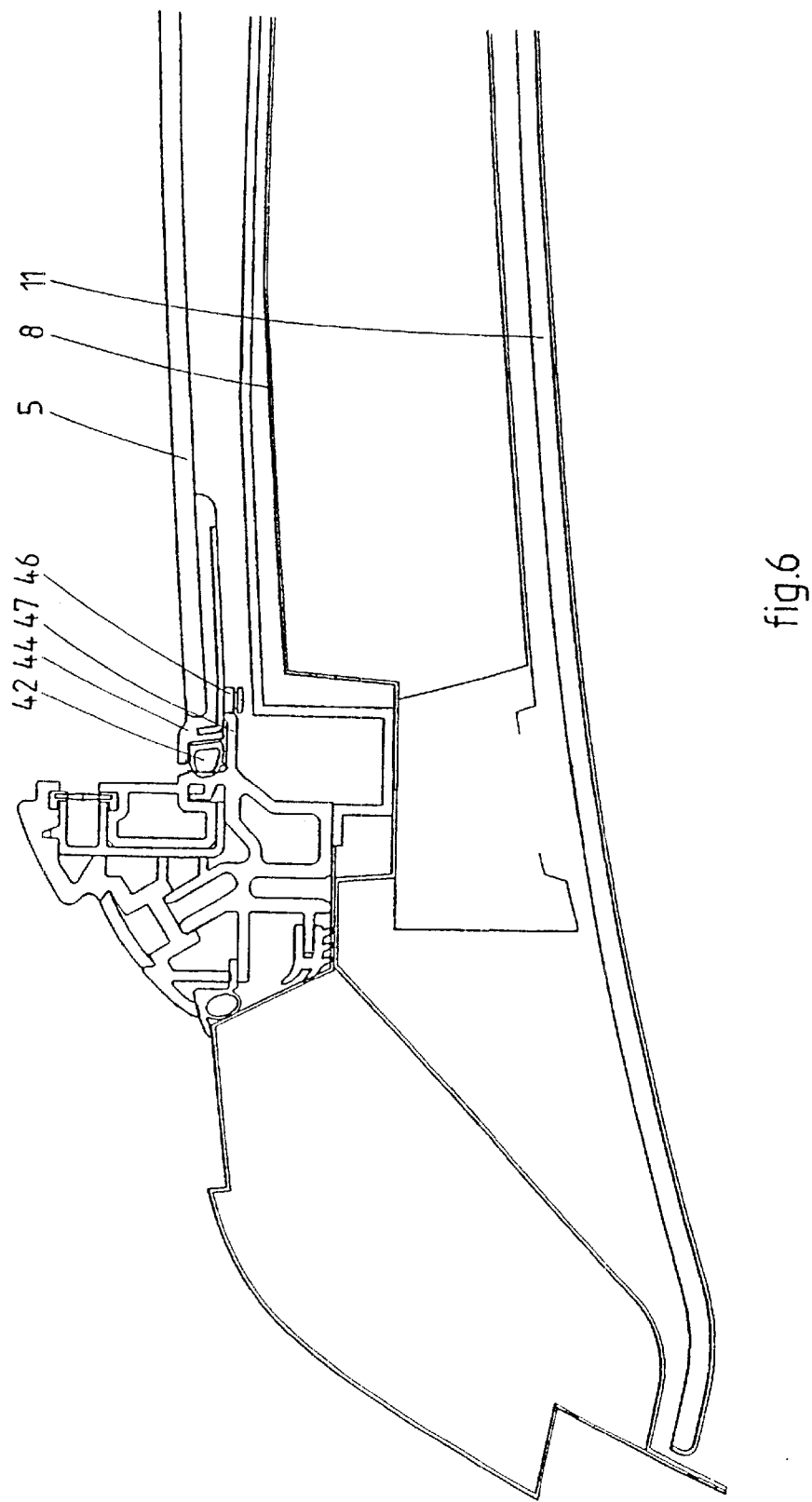
Figure 8:
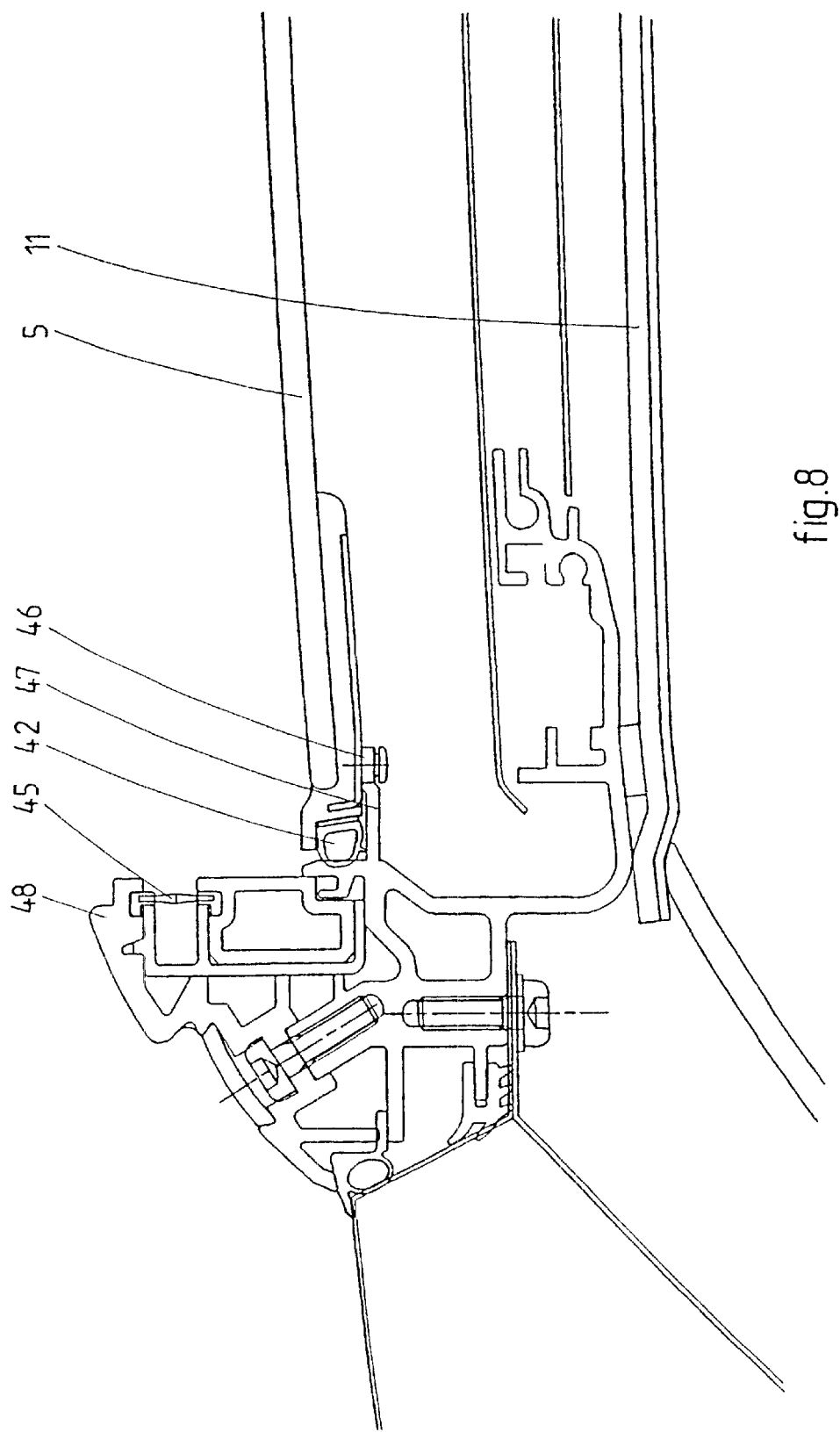
Figure 9:
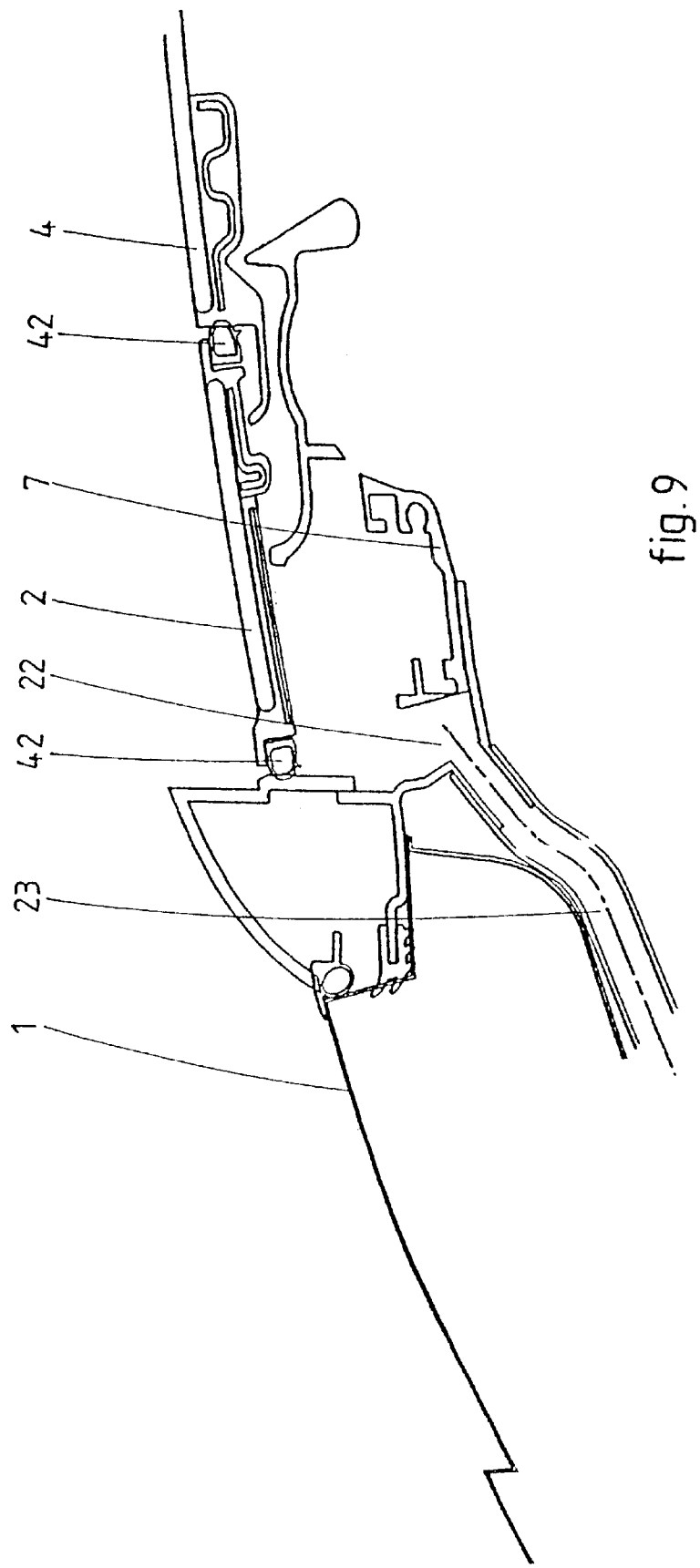
FIG. 9 is a sectional view along line IX—IX in FIG. 2.

FIGS. 6, 7 and 8 furthermore show that the rear, fixed panel 5 is detachably attached to a fastening flange 47 of lower extruded section 16 by means of screws 46, and that said panel is provided with a similar circumferential seal 42 as panel 4. Also panel 6 of the tilting-sliding roof is provided with said circumferential seal 42, as is shown in FIGS. 5 and 7. Said seals 42 provide a seal both to beams 7, 8 and 9 and between panels 4, 5 and 6. Said panels 4, 5 and 6 do not have a seal at a front edge, since the sealing of each panel against the panel positioned in front thereof takes place by means of the circumferential seal 42 which is present at the rear edge of the panel in front thereof. This is also the case with wind deflector 2. In the case of wind deflector 2, however, said circumferential seal 42 continues along the entire circumference.

FIGS. 4–8 furthermore show that upper extruded section 17 includes a mounting rail 48 for roof carriers, one end of which can be clamped round said mounting rail 48 on either side. Mounting rail 48 slightly slopes down in outward direction so as to join the rest of upper extruded section 17 and the further roof line of the vehicle as smoothly as possible.

Figure 10:
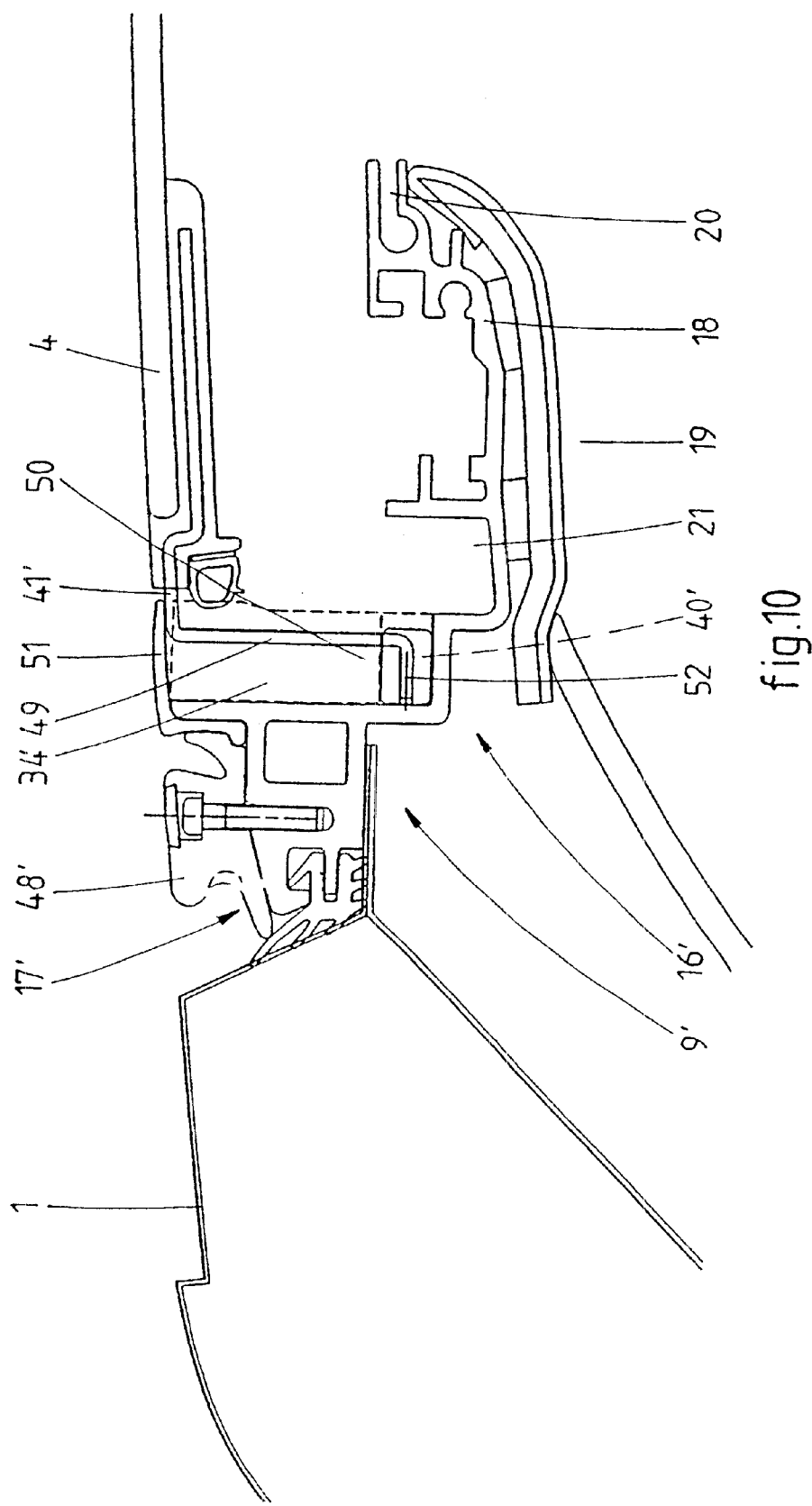
FIGS. 10 and 11 are sectional views along lines X—X and XI—XI, respectively, in FIG. 2, wherein a variant of the side beam is shown, however.
Figure 11:
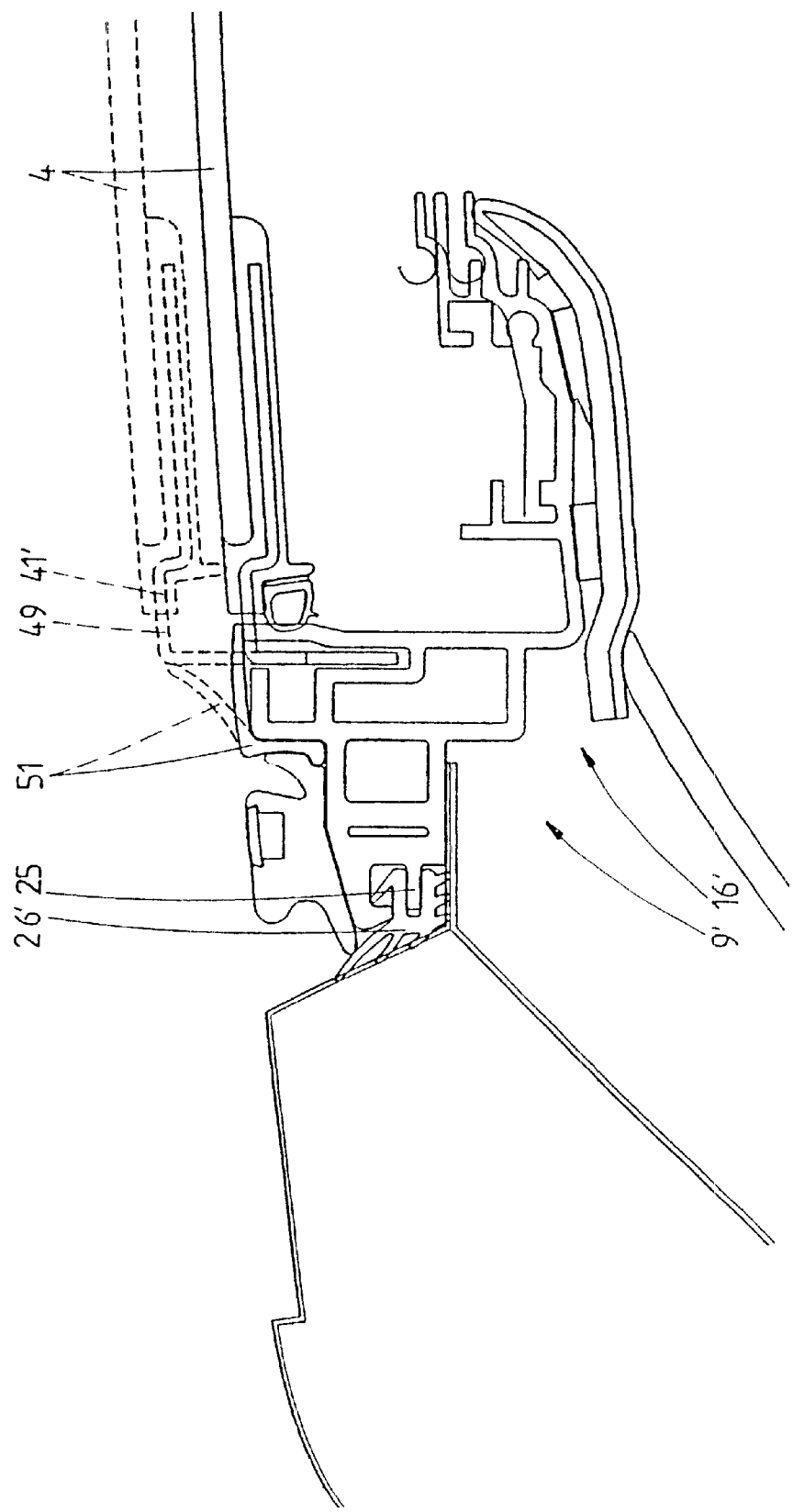
Figure 12:
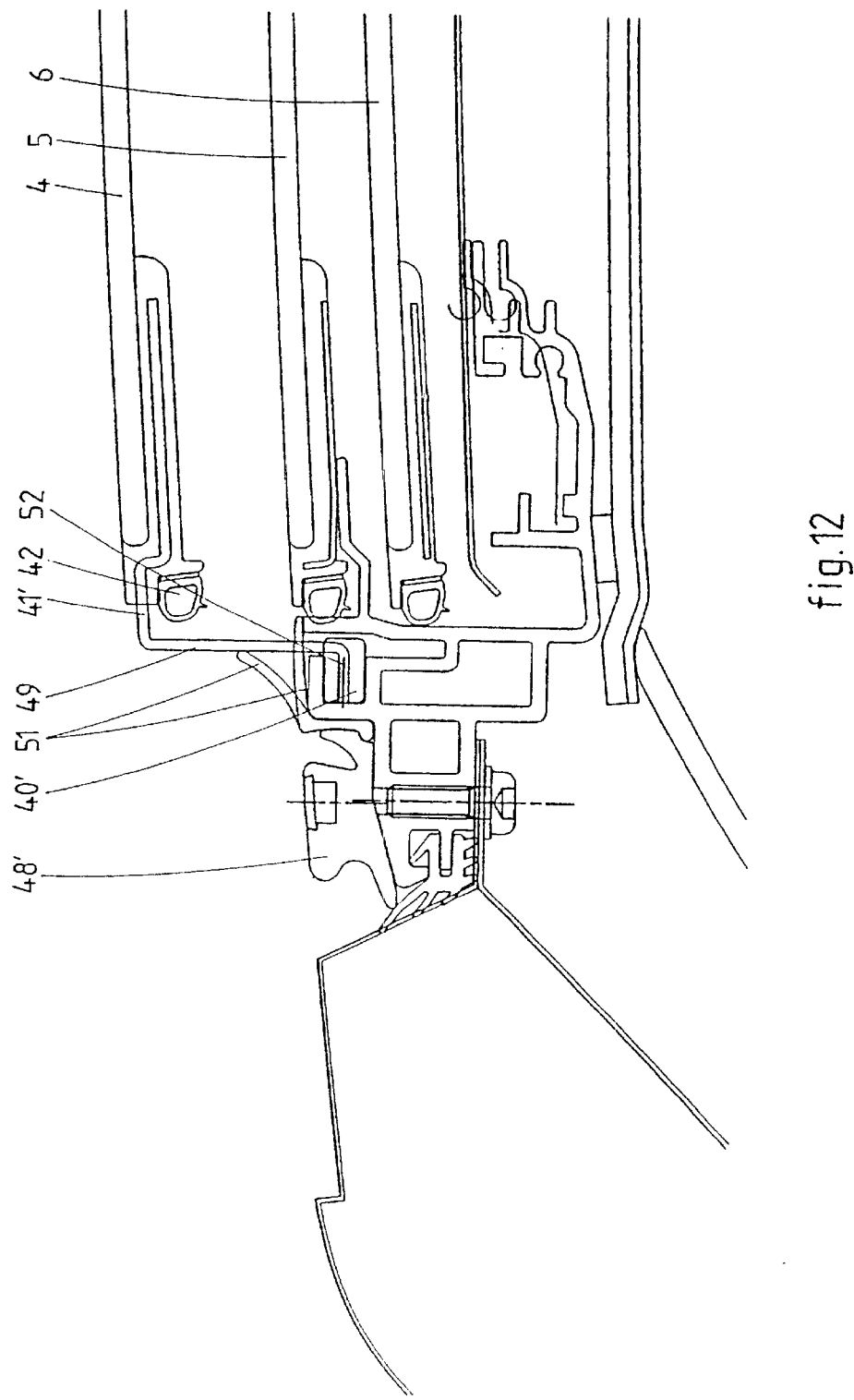
FIGS. 12 and 13 are sectional views corresponding to FIGS. 7 and 8 of the embodiment variant according to FIGS. 10 and 11 of the open roof construction according to the invention.
Figure 13:
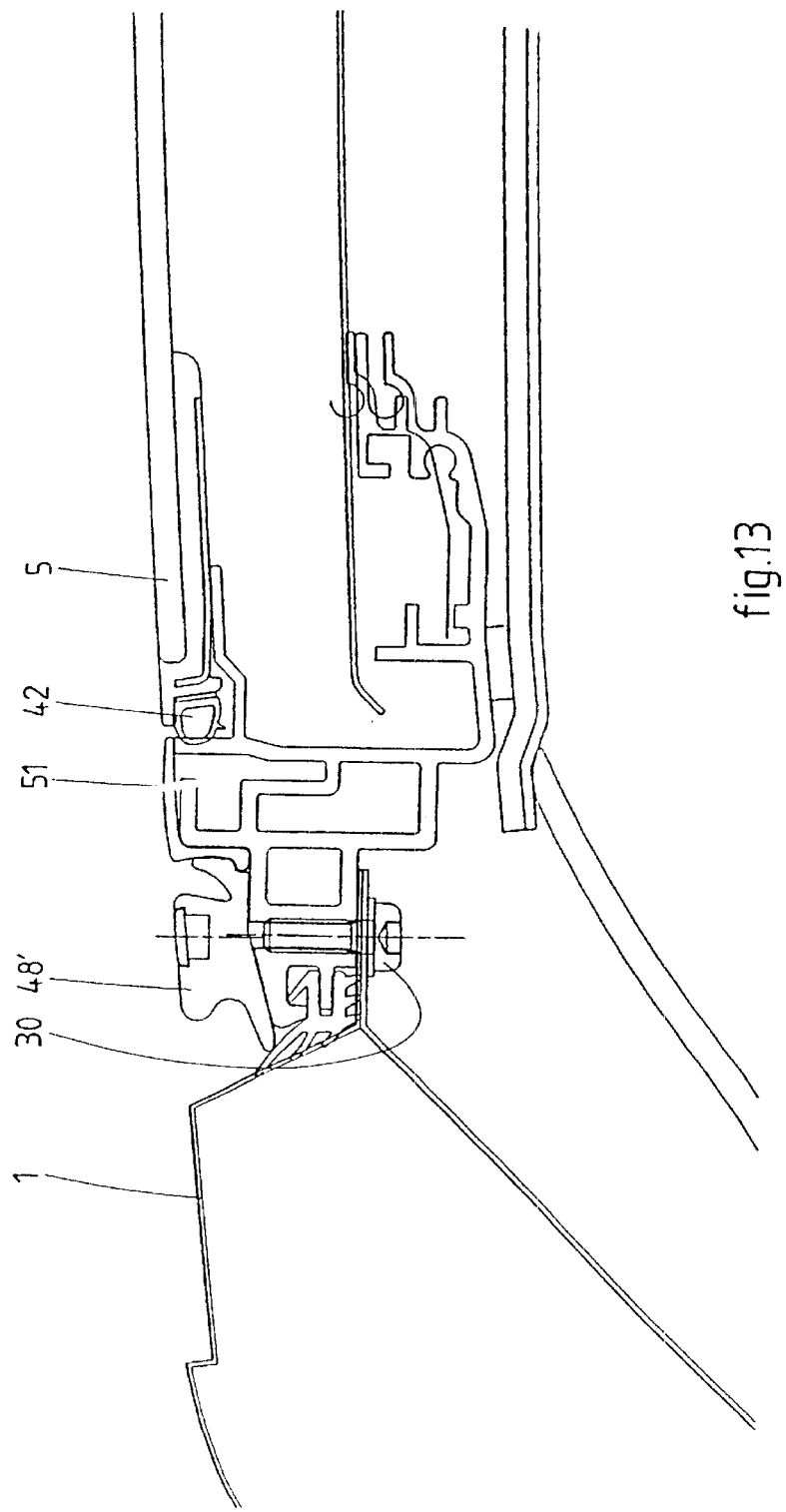

FIGS. 10–12 show a further variant of side beam 9, which is so configured that the upper side of strengthening beam 1 or of the fixed roof of the vehicle and the upper sides of mounting rail 48', of guide section 34' and of panels 4, 5, 6 are at least substantially in line in the closed position thereof, and that side beam 9 is nearly completely recessed in the roof, therefore. Guide section 34' is accommodated in the differently shaped lower extruded section 16' to that end, and upper extruded section 17' only consists of mounting rail 48'.

Because of the low position of guide section 34', special measures must be taken in order to obtain high position of panel 4 of the topslider above fixed panel 5 despite said low position, and to that end connecting part 41' is provided with a vertical extension portion 49, which extends in the extruded section 16' in the closed position of panel 4, with sliding shoe 40' extending on the bottom of the respective cavity in extruded section 16'. The upper side of said cavity 50 in extruded section 16, in which a guide section 34' may be present, is sealed by means of a lip-shaped element 51, which is clamped against extruded section 16' at the outer end by mounting rail 48'. Sealing element 51 is designed to be capable of deformation in such a manner that it forms a seal with its free end in the lower position against the upper end of a vertical flange of extruded section 16 bounding cavity 50, while sealing element 51 can bend upwards upon passage of connecting part 41 and sealingly abut against the vertical extension portion 49 of connecting part 41'. The sectional view according to FIG. 10 shows that the free end of sealing element 51 engages the upper side of the connecting part 41' of panel 4 in the front part of side beam 9', where panel 4 occupies its closed position. In this embodiment, in order to achieve proper abutment of sealing element 51 against connecting part 41', extension portion 49 is plate-shaped and extends sufficiently far downwards from the upper end so as to ensure continued proper abutment of sealing element 51 in the position according to FIG. 12. Extension portion 49 extends further downwards at the location of sliding shoes 40', and sliding shoe 40' is slid onto a horizontal projection 53 of extension portion 49. In this embodiment, guide groove 37 for sliding shoe 40' is formed directly in extruded section 16', but walls of lower extruded section 16' have been locally removed by means of a milling operation, in particular in places where sliding shoe 40' is to be guided to the lowermost position.

For the rest this embodiment is comparable with the embodiment as shown in FIGS. 3–9 to the present application.

It will be apparent from the foregoing that the invention provides an open roof construction which is remarkable for its well thought-out design.

The invention is not restricted to the above-described embodiment as shown in the drawing, which can be varied in several ways without departing from the scope of the invention. Thus, several elements of the invention could also be used in conventional open roof constructions intended to be mounted in an opening in the fixed roof of the vehicle directly or at a later stage.

What is claimed is:

1. An open roof construction for a vehicle having an opening in its fixed roof, comprising: a stationary part attachable to the roof having longitudinally extending side beams including guide rails on either side of the roof opening and rearwards thereof; at least one panel supported by said guide rails, the panel being adjustable between a closed position, in which it closes at least a part of the roof opening, and an open position, in which it releases the roof opening at least partially by rearward movement above the fixed roof, wherein the panel includes connectors having guide members, which are in engagement with guide slots in said guide rails; and a seal providing a seal between said panel and said stationary part in the closed position of said panel, wherein said seal is provided at an outer circumference of the panel and in that said seal mates with a substantially vertical surface of said stationary part in the closed position; and wherein the connectors extend between said guide members and the panel, above and along said seal.

2. The open roof construction according to claim 1, wherein said connectors each comprise a plate-shaped part on a side of the panel.

3. The open roof construction according to claim 2, wherein each plate-shaped connector engages in the associated guide slot of the guide rail, wherein the guide slot is covered on an upper side by a deformable sealing lip, which engages an upper side of the connector in the closed position of the panel and which is in engagement with a side of the plate shaped connector in the open position.

4. The open roof construction according to claim 3, wherein the guide members include sliding shoes which have been slid onto locally projecting, horizontally flanged lower ends of the plate-shaped connecting part.

5. The open roof construction according to claim 1, wherein each of the connecting parts extends inwardly of the seal under the panel, and wherein said connecting parts and said seal are connected to said panel by encapsulation.

6. The open roof construction according to claim 1, wherein each side beam includes a mounting rail for mounting roof carriers thereon, and wherein upper side of said mounting rails follow the line of the fixed roof at least substantially in a transverse direction.

7. The open roof construction according to claim 6, wherein the mounting rail is positioned laterally of an upper guide rail at each side beam, and wherein both are recessed in the fixed roof after being mounted on the vehicle such that upper sides of the fixed roof of the vehicle, of the mounting rail, of the guide rail and of the panel are at least substantially in line in the closed position.

8. The open roof construction according to claim 7, wherein the mounting rail comprise a separate extruded section, which is attached to the side beam.

9. The open roof construction according to claim 6, wherein said mounting rail is positioned at least substantially above the guide rail and said mounting rail is integrated as part of an upper extruded section.

10. The open roof construction according to claim 1, wherein each guide rail is provided with at least one guide groove, in which at least one guide member of the closure panel is slidable, and wherein the guide groove of each guide rail is covered by a deformable sealing element, which covers the guide groove and which can deform so as to allow the passage of the guide member of the closure panel.

11. The open roof construction according to claim 10, wherein each of said sealing elements is made up of two mutually engaging, flexible sealing members extending over said groove from opposite sides.

12. The open roof construction according to claim 10, wherein each of said sealing elements is made up of a sealing lip extending from one side of the guide groove to the opposite side.

13. The open roof construction according to claim 1, wherein each side beam is made up of two interconnected extruded sections comprising a horizontal part with upwardly directed guide grooves and an upright part, and wherein a separate guide section is clamped between said extruded sections.

14. The open roof construction according to claim 13, wherein parts of the extruded sections have been removed by means of a milling operation so as to make it possible to accommodate various lengths of guide sections.

15. The open roof construction according to claim 14, wherein two closure panels are provided, wherein the guide members of the first closure panel are guided in the guide grooves of lower extruded sections, and the guide members of the second closure panel are guided in said separate guide sections.

16. The open roof construction according to claim 15, wherein a seal is provided on the outside of the extruded sections so as to form a seal against the fixed roof of the vehicle, and wherein said seal is clamped between said extruded sections.

17. An open roof construction for a vehicle having an opening in its fixed roof, comprising: a stationary part attachable to the roof having longitudinally extending side beams including guide rails on either side of the roof opening and rearwards thereof; at least one closure panel supported by said guide rails, which is adjustable between a closed position, in which it closes the roof opening, and an open position, in which it releases the roof opening at least partially, wherein each side beam is made up of two interconnected extruded sections comprising a horizontal part with upwardly directed guide grooves and an upright part, and wherein a separate guide section is held in position by said extruded sections.

18. The open roof construction according to claim 17, wherein parts of the extruded sections have been removed by means of a milling operation so as to make it possible to accommodate various lengths of guide sections.

19. The open roof construction according to claim 17, wherein two closure panels are provided, wherein the guide members of the first closure panel are guided in the guide grooves of the lower extruded sections, and the guide members of the second closure panel are guided in said separate guide section.

20. A vehicle provided with an opening in a fixed roof for an open roof construction, the roof construction comprising:
 a stationary part attached to the roof having longitudinally extending side beams including guide rails on either side of the roof opening and rearwards thereof;
 at least one panel supported by said guide rails, the panel being adjustable between a closed position, in which it closes at least a part of the roof opening, and an open position, in which it releases the roof opening at least partially by rearward movement above the fixed roof, wherein the panel includes connectors having guide members, which are in engagement with guide slots in said guide rails;
 a seal providing a seal between said panel and said stationary part in the closed position of said panel, wherein said seal is provided at an outer circumference of the panel and in that said seal mates with a substantially vertical surface of said stationary part in the closed position; and
 wherein the connectors extend between said guide members and the panel, above and along said seal.

21. The vehicle according to claim 20, wherein said connectors each comprise a plate-shaped part on a side of the panel.

22. The vehicle according to claim 20, wherein each side beam includes a mounting rail for mounting roof carriers thereon, and wherein upper sides of said mounting rails follow the line of the fixed roof at least substantially in a transverse direction.

23. The vehicle according to claim 22, wherein the mounting rail is positioned laterally of an upper guide rail at each side beam, and wherein both are recessed in the fixed roof after being mounted on the vehicle such that upper sides of the fixed roof of the vehicle, of the mounting rail, of the guide rail and of the panel are at least substantially in line in the closed position.

24. The vehicle according to claim 20, wherein each side beam is made up of two interconnected extruded sections comprising a horizontal part with upwardly directed guide grooves and an upright part, and wherein a separate guide section is clamped between said extruded sections.

25. The vehicle according to claim 24, wherein parts of the extruded sections have been removed by means of a milling operation so as to make it possible to accommodate various lengths of guide sections, wherein two closure panels are provided, wherein the guide members of the first closure panel are guided in the guide grooves of lower extruded sections, and the guide members of the second closure panel are guided in said separate guide sections.

* * * * *